Patented Mar. 24, 1936

2,034,923

UNITED STATES PATENT OFFICE 2,034,923.

MANUFACTURE OF TITANIUM PIGMENTS

Charles L. Schmidt, St. Louis, Mo., assignor to Titanium Pigment Company, Inc., New York, N. Y., a corporation of Maine No Drawing. Application July 19, 1934, Serial No. 736,045

16 Claims. (Cl. 23—202)

My invention relates to the preparation of titanium pigments, particularly to improvements in the methods of precipitating titanium hydrates from titanium solutions and, more particularly, to the preparation of improved titanium nuclear solutions and their use as a catalyst in the precipitation of titanium compounds by hydrolysis at elevated temperatures.

By "nuclear solutions", I means solutions containing titanium compounds, which will accelerate the hydrolysis and precipitation of hydrated titanium oxide from titanium solutions.

The objects of my invention are, among other things, new and improved methods for the preparation of hydrated titanium precipitates which, after filtration and calcination, are of an extremely white color, fine texture, and furthermore possess excellent covering power and high tinting strength. A further feature of my invention is the preparation of novel forms of titanium nuclei possessing such properties that when they are added to solutions of titanium, they will accelerate the precipitation of hydrated titanium precipitates that are capable of easy filtration and subsequent transformation into superior titanium pigments. These and other objects are accomplished by following the procedures comprising my invention as hereinafter set forth.

I am aware that it has been proposed to prepare separately colloidal nuclear solutions which, when added to titanium solutions, accelerate the precipitation upon heating. Furthermore, it has been previously proposed to prepare separately a suspension of titanium compounds which, when added to titanium solutions, also accelerate the precipitation. However, such methods for the preparation of such solutions and suspensions are directed to a treatment of sulfuric acid solutions of titanium and iron.

These solutions and suspensions as used always contain iron. I have found that the presence or iron not only adversely affects the efficiency of the nuclei in accelerating hydrolysis but, in addition, yields a product which, after calcination, is greatly inferior in color to the products obtained from the operation of my improved methods. One distinguishing feature of my invention, among others, therefore, is the use in titanium solutions of nuclei that are substantially free from iron.

As starting material for the preparation of my nuclei, I prefer to use iron-free ortho-titanic acid. This ortho-titanic acid may be prepared in several different ways. I may, for example, prepare a sulfuric acid solution of iron and titanium from ilmenite, reduce the iron salts to ferrous condition, and remove them from the solutions in any well-known manner, as by chilling the solution to induce crystallization of the ferrous salts, and subsequent filtration.

I may, also, dissolve in sulfuric acid the reaction product of a fusion or sintering of rutile with an alkali, such as sodium carbonate, and, if necessary, remove the iron from such solution. Furthermore, I may dissolve in sulfuric acid titanyl sulfate previously treated to remove the iron impurities. A sulfuric acid solution of meta-titanic acid, free from iron, may also be used for the preparation of my improved nuclei.

Such a solution of titanium, obtained by any of the above methods, and containing, for example, 100–150 grams of titanium oxide per liter and from 200–300 grams per liter of sulfuric acid but substantially free from iron, I then treat with an alkaline reagent, such as ammonium hydroxide, at room temperature, in such quantity as not to exceed a pH value of 2.5. As a result of this treatment, a turbidity results which is due to formation of finely-divided precipitate.

Previous processes contemplated the separation of this precipitate, and subsequent solution in sulfuric acid or titanium solution. This is not necessary according to my improved methods, since I continue to stir the turbid solution at ordinary temperatures, and in a short time the turbidity disappears and the solution becomes clear.

Inasmuch as my precipitates are essentially pure, it may be found desirable to add certain salts to assist in redissolution. It has been previously suggested that the use of certain sulfates, such as sodium sulfate, are suitable for such purpose. I have found, however, that with my precipitates, any neutral, ionizable salt which is an electrolyte, may be used; for example, ammonium chloride, sodium chloride, potassium nitrate, ammonium phosphate, and the like, may equally be used. At this stage in my methods, the nuclear solutions are substantially true crystalloidal systems as I have proved by optical test. These solutions are then heated to develop their nucleating properties. I have found that heating at two hours at 80°–85° C., or three hours at 70°–75° C., are suitable treatments to secure the desired results.

My improved nuclei are distinguished from those of prior processes in that, when added to a titanium solution, they not only accelerate the precipitation of hydrated titanium oxides, but produce a pigment which, after washing and calcination, possesses superior color, hiding power and tinting strength.

The quantity of my improved nuclei to be added to a titanium solution to accelerate precipitation of an improved product is somewhat variable. Amounts varying from 0.5–10% of the nuclei suspension calculated on the titanium oxide have proven effective, and are efficient with titanium solutions of wide variations, both in concentration of acid and $TiO_2$ content and in the ratio of $TiO_2$ to $SO_4$ radical present in the solution. When a solution of titanium containing my nuclei is heated to its boiling point or thereabouts to effect precipitation, from 90–95% of its titanium content is precipitated in a relatively short time, usually from 1–3 hours.

The following specific examples are now given in order to illustrate my invention; however, I do not wish to limit the scope of the invention thereby:

*Example I.*—130,830 lbs. of solution at 50° C., of the composition:

| | Per cent |
|---|---|
| $TiO_2$ | 6.44 |
| $FeSO_4$ | 13.20 |
| $H_2SO_4$ | 19.93 | are added to 15,575 lbs. of boiling water containing 150 lbs. of hydrated lime. The solution is then boiled one hour, and about 95% of the $TiO_2$ precipitates as meta-titanic acid or basic titanic sulfate. The iron and acid are then removed from the precipitated $TiO_2$ by washing with water.

506 lbs. of 66° Baumé sulfuric acid at 120° C., are added to 605 lbs. of this washed meta-titanic acid pulp containing 37.8% $TiO_2$.

The material is agitated during the addition, and then allowed to stand for one hour. The relatively pure solution of titanium is cooled and then diluted slowly with water, to the following composition:

| | Per cent |
|---|---|
| $TiO_2$ | 13.3 |
| $H_2SO_4$ | 27.7 |
| $Fe_2O_3$ | 0.7 |

970 lbs. of this solution are then treated with 4 lbs. of zinc to reduce the iron to the ferrous state. 2100 lbs. of 8.34% sodium hydroxide are then added to this solution with constant agitation. The $TiO_2$ which is partly precipitated as ortho-titanic acid, is dissolved by agitating for about an hour, and the solution then has a composition of:

| | Per cent |
|---|---|
| $TiO_2$ | 4.20 |
| $H_2SO_4$ | 1.76 |
| $Na_2SO_4$ | 10.1 |

This solution is then heated, with agitation, for three hours at 70°–75° C. To this solution are added 50,000 lbs. of titanium sulfate solution having a composition of:

| | Per cent |
|---|---|
| $TiO_2$ | 6.44 |
| $FeSO_4$ | 13.20 |
| $H_2SO_4$ | 19.93 |

The mixture is boiled for about three hours and 90–97% of the titanium oxide is precipitated, which is then washed and calcined in the usual way.

*Example II.*—Titanyl sulfate crystals are dissolved in water to form a solution of the following composition:

| | Per cent |
|---|---|
| $TiO_2$ | 4.84 |
| $H_2SO_4$ | 5.28 |
| $Fe_2O_3$ | 0.01 |

1370 lbs. of this solution are then treated with a small amount of zinc to reduce any ferric iron, and 76 lbs. of sodium sulfate are dissolved in it. 213 lbs. of 15% sodium hydroxide are then added. The ortho-titanic acid is dissolved by agitating for about an hour, at which time the composition is approximately as follows:

| | Per cent |
|---|---|
| $TiO_2$ | 4.0 |
| $H_2SO_4$ | 2.0 |
| $Na_2SO_4$ | 8.0 |

The solution is heated at 80–85° C. for two hours. To this heat-treated solution are added 25,000 lbs. of a titanium sulfate solution having approximately the following composition:

| | Per cent |
|---|---|
| $TiO_2$ | 13.3 |
| $H_2SO_4$ | 20.0 |
| $Fe_2SO_4$ | 9.15 |

The mixture is boiled and about 95% of the titanium oxide ($TiO_2$) precipitates in five hours.

*Example III.*—100 lbs. of rutile (1.0%+325 mesh) are dried with 125 lbs. of a 20% solution of sodium carbonate. The dried material is crushed and roasted for several hours at 950° C.; the lumps are then broken up and digested with 66° Baumé sulfuric acid. The digestion mass is dissolved in water, reduced with iron, and has approximately the following composition:

| | Per cent |
|---|---|
| $TiO_2$ | 14.68 |
| $H_2SO_4$ | 28.20 |
| $FeSO_4$ | 1.4 |
| $Ti_2(SO_4)_3$ | 0.13 |

125 lbs. of this solution are diluted with 205 lbs. of water, and 131 lbs. of 16.2% sodium hydroxide solution are then added. The resulting solution is agitated until the ortho-titanic acid dissolves, and then has approximately the following composition:

| | Per cent |
|---|---|
| $TiO_2$ | 3.8 |
| $H_2SO_4$ | 2.1 |
| $Na_2SO_4$ | 8.2 |
| $FeSO_4$ | 0.36 |

This solution is heated for two hours at 80–85° C., and then is added to 2980 lbs. of a solution of the following composition:

| | Per cent |
|---|---|
| $TiO_2$ | 14.68 |
| $H_2SO_4$ | 28.20 |
| $FeSO_4$ | 1.4 |

The mixture is boiled and about 98% of the titanium oxide ($TiO_2$) precipitates in four hours.

I claim as my invention:

1. A method for making hydrolytically precipitated titanium oxide from a titanium solution, which comprises preparing a nuclear solution substantially free from iron by dissolving a titanium compound in sulfuric acid, removing the iron present to obtain a substantially pure titanium solution, neutralizing said solution with an alkaline reagent to cause precipitation, agitating said solution containing the precipitate until it becomes clear, then heating the solution to develop its nucleating properties, mixing said nuclear solution with said titanium solution, and heating the combined solutions to effect hydrolytic precipitation of titanium compounds.

2. A method for making hydrolytically precipitated titanium oxide from a titanium solution, which comprises preparing a nuclear solution substantially free from iron by dissolving iron-free ortho-titanic acid in sulfuric acid, removing the iron present to obtain a substantially pure titanium solution, neutralizing said solution with an alkaline reagent to cause precipitation, agitating said solution containing the precipitate until it becomes clear, then heating the solution to develop its nucleating properties, mixing said nuclear solution with said titanium solution, and heating the combined solutions to effect hydrolytic precipitation of titanium compounds.

3. A method for making hydrolytically precipitated titanium oxide from a titanium solution, which comprises preparing a nuclear solution substantially free from iron by dissolving iron-free meta-titanic acid in sulfuric acid, removing the iron present to obtain a substantially pure titanium solution, neutralizing said solution with an alkaline reagent to cause precipitation, agitating said solution containing the precipitate until it becomes clear, then heating the solution to develop its nucleating properties, mixing said nuclear solutions with said titanium solution, and heating the combined solutions to effect hydrolytic precipitation of titanium compounds.

4. A method for making hydrolytically precipitated titanium oxide from a titanium solution, which comprises preparing a nuclear solution substantially free from iron by dissolving purified titanyl sulfate in sulfuric acid, removing the iron present to obtain a substantially pure titanium solution, neutralizing said solution with an alkaline reagent to cause precipitation, agitating said solution containing the precipitate until it becomes clear, then heating the solution to develop its nucleating properties, mixing said nuclear solution with said titanium solution, and heating the combined solutions to effect hydrolytic precipitation of titanium compounds.

5. A method for making hydrolytically precipitated titanium oxide from a titanium solution, which comprises preparing a nuclear solution substantially free from iron by dissolving in sulfuric acid the reaction product of rutile sintered with an alkali, removing any iron present to obtain a substantially pure titanium solution, neutralizing the solution with an alkaline reagent to cause precipitation, agitating said solution containing the precipitate until it becomes clear, then heating the solution to develop its nucleating properties, mixing said nuclear solution with said titanium solution, and heating the combined solutions to effect hydrolytic precipitation of titanium compounds.

6. A method for making hydrolytically precipitated titanium oxide from a titanium solution, which comprises preparing a nuclear solution substantially free from iron by dissolving a titanium compound in sulfuric acid, removing the iron present to obtain a substantially pure titanium solution, neutralizing said solution with an alkaline reagent in an amount that a pH value will not exceed 2.5 to cause precipitation therein, agitating at ordinary temperatures the solution containing the precipitate until it becomes clear, heating the solution below 85° C. to develop its nucleating properties, adding from 0.5–10% of said nuclear solution to said titanium solution, and boiling the combined solutions to effect hydrolytic precipitation of titanium compounds.

7. A method for preparing a titanium nuclear solution substantially free from iron, which consists in dissolving in sulfuric acid a titanium compound, removing the iron present to obtain a substantially pure titanium solution, adding an alkaline reagent until the solution becomes turbid, agitating the solution until it becomes clear, and heating the solution to develop its nucleating properties.

8. A method for preparing a titanium nuclear solution substantially free from iron, which consists in dissolving a titanium compound in sulfuric acid, removing the iron present to obtain a substantially pure titanium solution, neutralizing the solution with an alkaline reagent in an amount that a pH value of 2.5 is not exceeded until turbidity occurs, adding to the solution a neutral ionizable salt with agitation until the solution becomes clear, and heating the solution to develop its nucleating properties.

9. A method for preparing a titanium nuclear solution substantially free from iron, which consists in dissolving a titanium compound in sulfuric acid, removing the iron present to obtain a substantially pure titanium solution, neutralizing the solution with ammonium hydroxide in an amount that a pH value of 2.5 is not exceeded to cause precipitation, adding ammonium chloride to the solution, agitating at ordinary temperature until the solution becomes clear, and heating the solution below 85° C. to develop its nucleating properties.

10. In the method for preparing a titanium nuclear solution, the steps which comprise preparing an iron-free and substantially pure solution of titanium in sulfuric acid, and, after neutralizing with an alkaline reagent to cause precipitation, adding a neutral ionizable salt to assist in redissolution of the precipitate by agitation.

11. In the method for preparing a titanium nuclear solution, the steps which comprise preparing an iron-free and substantially pure solution of titanium in sulfuric acid, and adding an alkaline reagent in an amount insufficient to produce a pH value exceeding 2.5, adding a neutral ionizable salt to assist in redissolution of the precipitate by agitation.

12. In the method for preparing a titanium nuclear solution, the steps which comprise preparing an iron-free and substantially pure solution of titanium in sulfuric acid, neutralizing with ammonium hydroxide in an amount that the pH value will not exceed 2.5, and adding ammonium chloride to assist in redissolution of the precipitate by agitation.

13. In the method for preparing a titanium nuclear solution, the steps which comprise preparing an iron-free and substantially pure solution of titanium by dissolving a titanium compound in sulfuric acid, removing iron, neutralizing with an alkaline reagent to cause precipitation, adding a neutral ionizable salt, and agitating the solution until it becomes clear.

14. In the method for preparing a titanium nuclear solution, the steps which comprise preparing an iron-free and substantially pure solution of titanium by dissolving iron-free ortho-titanic acid in sulfuric acid, adding an alkaline reagent in an amount that a pH value will not exceed 2.5, adding ammonium chloride, and agitating the solution at ordinary temperatures until it becomes clear.

15. In the method for preparing a titanium nuclear solution, the step which consists in adding to a turbid solution of a titanium compound in sulfuric acid substantially free from iron and having a pH value not in excess of 2.5, a neutral ionizable salt to assist in redissolution of the precipitate by agitation.

16. In the method for preparing a titanium nuclear solution, the step which consists in adding ammonium chloride to a turbid solution of a titanium compound in sulfuric acid substantially free from iron and having a pH value not in excess of 2.5 to assist in redissolution of the precipitate by agitation at ordinary temperatures.

CHARLES L. SCHMIDT.